United States Patent Office 2,956,988
Patented Oct. 18, 1960

2,956,988

COPOLYMERS OF 1,1-DIFLUOROISOBUTYLENE

John J. Drysdale, Clifton Park Manor, Del., assignor to E. I. du Pont de Nemours and Company, Wilmington, Del., a corporation of Delaware No Drawing. Filed Dec. 15, 1955, Ser. No. 553,196

8 Claims. (Cl. 260—87.7)

This invention relates to new polymeric materials. More particularly, it relates to new halogen-containing copolymers having unusual properties, and to methods for their preparation.

Polymers of various halogen-substituted olefins are known. Some of these possess certain properties which make them quite valuable in practical applications. In fact, some polymers of this type, e.g., polyvinyl chloride, polytetrafluoroethylene, and polychlorotrifluoroethylene, have achieved commercial success. However, for some purposes, the known polymers do not have certain properties which are desirable. For example, polytetrafluoroethylene and polyvinyl fluoride possess outstanding chemical and thermal stability, but they are not as amenable to shaping under high pressure and temperature as desired in some applications, e.g., in injection molding.

This invention has as an object provision of a new class of copolymers having a desirable combination of properties. Another object is the provision of a preparation of fluorinated polymers of high chemical and thermal stability which are amenable to shaping under high pressure and temperature. A further object is the provision of injection moldable copolymers of high fluorine content. Other objects will appear hereinafter.

These objects are accomplished by the present invention of copolymers of 1,1-difluoroisobutylene with fluoroethylenes containing 5% to 95% by weight of difluoroisobutylene. These copolymers are especially amenable to injection molding and have outstanding chemical and thermal stability.

The copolymers of this invention are prepared by subjecting a mixture of 1,1-difluoroisobutylene and at least one fluoroethylene to addition polymerization. Thus, 1,1-difluoroisobutylene can be copolymerized with the fluoroethylenes by emulsion, solution, bulk or bead methods in the presence of an addition polymerization initiator. The particular polymerization method employed with any particular mixture of comonomers is dependent on the particular comonomer employed with the difluoroisobutylene. The addition polymerization initiator can be any free radical polymerization catalyst. These initiators are used in conventional quantities, amounts ranging from 0.01% to 10% or more, based on the weight of the comonomers, being operable.

The proportions of 1,1-difluoroisobutylene and the fluoroethylene can vary widely, the exact proportions of reactants employed being dependent on the particular monomers being used and the proportion of 1,1-difluoroisobutylene units desired in the final copolymer. The amount of difluoroisobutylene units in the polymer obtained from any given proportion of comonomers depends on the relative polymerization rates of the comonomers employed, and on the polymerization conditions being used. In general, proportions of 1,1difluoroisobutylene amounting to from 5% to 95% by weight of the comonomers in the polymerization system can be employed.

The temperature and pressure at which the copolymerization of 1,1-difluoroisobutylene with the fluoroethylene is carried out can vary widely, depending on the particular monomers being employed, the particular initiators being used, and the particular polymerization system being employed. Temperatures ranging from room temperature, e.g., 20°–30° C., up to 150° C. or higher can be used. Similarly, pressures ranging from atmospheric to superatmospheric, e.g., up to several thousand atmospheres, can be employed.

The 1,1-difluoroisobutylene used in making the copolymers of this invention can be prepared by pyrolyzing 1,1-dimethyl-2,2,3,3-tetrafluorocyclobutane (cf. U.S. 2,462,345) at 600° to 1000° C. preferably at 750°–900° C. and a pressure of less than 50 mm. of mercury with very rapid passage of the pyrolysis mixture through the pyrolysis zone. The reactor can be of any heat resistant inert material, e.g., quartz, stainless steel, etc., and can have the pyrolysis zone packed with an inert packing e.g., granular quartz, nickel, or platinum, to provide better heat transfer. The fluoroethylenes used in the process of this invention can be the usual grades of compounds that are available commercially for use in polymerizations, or they can be made by known methods. Best results, of course, are obtained with monomers of the highest purity.

The following examples in which parts are by weight are illustrative of the invention.

*Example 1*

A mixture of 30 parts of vinyl fluoride and 5 parts of 1,1-difluoroisobutylene with 15 parts of distilled water and 0.1 part of di-tertiary butyl peroxide and 0.1 part of disodium hydrogen phosphate heptahydrate is heated eight hours at 135° C. under 1000 atmospheres water pressure in a silver-lined reaction vessel. At the end of this period there is isolated 32.4 parts of a white copolymer of 1,1-difluoroisobutylene and vinyl fluoride having a softening point of 104° C. and a melting point of 126° C. A film pressed from this copolymer at 140° C. under a pressure of 10,000 pounds is clear, tough, and cold-drawable. This copolymer is heat stable, there being no apparent decomposition after being heated at 210° C. for five minutes. This copolymer has a flow number of 36, which indicates that it is well suited for injection molding or extrusion application. This polymer does not fail in an ultraviolet light-ozone accelerated aging test until after 120 hours. The copolymer is soluble up to 20% by weight in either dioxane or cyclohexanone at room temperature.

The unusual properties of this copolymer of Example I are evident from the following properties possessed by a vinyl fluoride homopolymer. The vinyl fluoride homopolymer has a flow number of 20 (determined at 230° C.), partially decomposes after heating at 210° C. for five minutes, and fails in the ultraviolet light-ozone accelerated aging test after 100–120 hours.

Furthermore, a comparable copolymer of vinyl fluoride and isobutylene, as regards solubility in dioxane, has a softening point appreciably lower than 100° C. and fails in approximately 90–100 hours in the accelerated aging test.

In the examples the melt-flow characteristics of a polymer are indicated by "flow numbers." These flow numbers are determined as the square of the diameter in inches of a film pressed from one gram of polymer in five minutes at 210° C. under 10,000 pounds pressure. Polymers having flow numbers above 15 in this test can be molded satisfactorily, and those having flow numbers above 25 are especially suitable for injection molding.

The accelerated aging test mentioned in the examples is carried out as follows. Strips of copolymer film are exposed at room temperature to ultraviolet light (3 inches from an AH6 U.V. lamp) in a chamber into which a stream of air containing 0.12% ozone is constantly being supplied. The film is considered to fail when it is brittle to a crease test (creasing of the film 180°).

Example II

A mixture of 50 parts of vinyl fluoride, 5 parts of 1,1-difluoroisobutylene, and 0.1 part of di-tertiary butyl peroxide is heated for eight hours at 135° C. under 500 atmospheres water pressure in a silver-lined reaction vessel. At the end of this reaction period a white copolymer having a softening point of 160° C. and a melting point of 174° C. is obtained in a yield amounting to 28.2 parts. A film pressed from this copolymer of vinyl fluoride and 1,1-difluoroisobutylene at 180° C. under 10,000 pounds pressure is tough, clear, and cold drawable. This copolymer has a flow number of 20 and does not fail in the accelerated aging test until about 173 hours exposure.

This copolymer exhibits light and heat stability superior to polyvinyl fluoride, while having a molding temperature of 180° C. as compared with 210–220° C. for polyvinyl fluoride. More particularly, the copolymer film shows no discoloration after five minutes at 210° C. under 10,000 pounds pressure; whereas, polyvinyl fluoride shows some discoloration under the same conditions. Furthermore, typical polyvinyl fluoride fails in the accelerated aging test at 100–120 hours (light stability).

Example III

A solution of 3 parts of 1,1-difluoroisobutylene and 0.05 part of $\alpha,\alpha'$-azobis-isobutyronitrile in 45 parts of perfluorodimethylcyclohexane is placed in a silver-lined reaction vessel capable of withstanding high pressure. The reaction vessel is then pressured to 450 lbs./sq. in. gauge at 80° C. for four hours with tetrafluoroethylene. At the end of this reaction period there is obtained 1.7 parts of a white copolymer of 1,1-difluoroisobutylene and tetrafluoroethylene having a softening point of approximately 110° C. and a melting point of 140–150° C. This copolymer can be pressed at 140° C. under 1000 pounds pressure to a clear film. On analysis this copolymer is found to contain 26.1% of 1,1-difluoroisobutylene.

Polytetrafluoroethylene is highly stable and chemically inert. It does not show a true melting point but sinters on heating to a high temperature (360–370° C.). A significant flow number cannot be obtained for this homopolymer. Copolymers of tetrafluoroethylene with perfluoropropylene do have melting points, but copolymers even containing high percentages of perfluoropropylene have melting points above 275° C. Copolymers having lower percentages of perfluoropropylene have even higher melting points. In contrast, the copolymer of difluoroisobutylene and tetrafluoroethylene of Example III, while maintaining the stability and chemical inertness of polytetrafluoroethylene, can be molded at temperatures as low as 140° C.

Example IV

A solution of 35 parts of tetrafluoroethylene, 1.4 parts of 1,1-difluoroisobutylene, and 0.02 part of 1,1'-azodicyclohexanecarbonitrile in 90 parts of perfluorodimethylcyclohexane is heated for 12 hours at 100° C. under autogenous pressure in a silver-lined reaction vessel capable of withstanding superatmospheric pressure. At the end of this period there is obtained 9.5 parts of a white copolymer of 1,1-difluoroisobutylene and tetrafluoroethylene having a softening point of 272° C. and a melting point of 280° C. A clear film is pressed from this copolymer at 280° C. under a pressure of 4000 pounds. Analysis shows this copolymer to contain 10.1% difluoroisobutylene.

Example V

A mixture of 20 parts of vinylidene fluoride, 5 parts of 1,1-difluoroisobutylene, and 0.1 part of di-tertiary butyl peroxide is heated for eight hours at 135° C. under 1000 atmospheres water pressure. At the end of this period there is obtained 11.3 parts of a soft, slightly rubbery copolymer of vinylidene fluoride and 1,1-difluoroisobutylene. This copolymer has a melting point of 48° C.

Example VI

A mixture of 40 parts of vinylidene fluoride, 4 parts of 1,1-difluoroisobutylene, and 0.1 part of ditertiary butyl peroxide is heated for eight hours at 135° C. under 1000 atmospheres water pressure. At the end of this polymerization time there is isolated 34.4 parts of a white copolymer of vinylidene fluoride and 1,1-difluoroisobutylene. This copolymer has a softening point of 112° C. and a melting point of 128° C. A film pressed from this copolymer at 150° C. and under 5000 pounds pressure is clear, water-white, and very limp.

Example VII

A mixture of 25 parts of tetrafluoroethylene, 7 parts of 1,1-difluoroisobutylene, 35 parts of water, and 0.1 part of benzoyl peroxide is heated in a reaction vessel capable of withstanding superatmospheric pressure for ten hours at 85° C. At the end of this time an approximately 5% yield of solid copolymer of 1,1-difluoroisobutylene and tetrafluoroethylene is obtained.

ANALYSIS

Calculated for $C_2F_4$: C, 24.01%; F, 75.99%
Calculated for $C_4F_2H_6$: C, 52.16%; H, 6.56%; F, 41.26%
Found: C, 34.47%, 34.45%; H, 2.51%, 2.30%; F, 57.03%

These analytical data and the infrared absorption spectra obtained on the polymer indicate that it is a copolymer of tetrafluoroethylene and 1,1-difluoroisobutylene.

The above examples illustrate the invention in copolymers of 1,1-difluoroisobutylene with certain fluoroethylenes. Similar copolymers of 1,1-difluoroisobutylene can be prepared by replacing the particular fluoroethylenes of the examples by similar quantities of vinyl chloride, vinylidene chlorofluoride, and chlorotrifluoroethylene. The invention is generic to copolymers of 1,1-difluoroisobutylene with fluoroethylenes. As noted previously, these copolymers possess the highly desirable combination of good thermal and chemical stability with good flow characteristics at elevated temperatures which enables them to be used for injection molding.

The examples have illustrated the preparation of the copolymers of this invention by use of azo- and peroxy-type addition polymerization initiators. These are especially effective types of initiators in the reaction of this invention. Other specific examples of these types of initiator include diethyl peroxide, diacetyl peroxide, tertiary butyl hydroperoxide, peracetic acid, and ammonium persulfate; and dimethyl $\alpha,\alpha'$-azodiisobutyrate, $\alpha,\alpha'$-azodiisobutyramide, and $\alpha$-(carbamylazo)isobutyronitrile.

The copolymers of 1,1-difluoroisobutylene with fluoroethylenes are useful for the preparation of films, coating compositions, and the like. They are especially suitable for use in the preparation of molded articles having good resistance to heat and chemicals and of extruded sheeting for outdoor uses.

The foregoing detailed description has been given for clearness of understanding only and no unnecessary limitations are to be understood therefrom. The invention is not limited to the exact details shown and described for obvious modifications will occur to those skilled in the art.

The embodiments of the invention in which an exclusive property or privilege is claimed are defined as follows:

1. A normally-solid copolymer of 5–95% by weight of 1,1-difluoroisobutylene with a fluoroethylene.

2. The normally-solid copolymer of 5–95% by weight of 1,1-difluoroisobutylene with tetrafluoroethylene.

3. The normally-solid copolymer of 5-95% by weight of 1,1-difluoroisobutylene with vinyl fluoride.

4. A film of a normally-solid copolymer of 5-95% by weight of 1,1-difluoroisobutylene with a fluoroethylene.

5. A film of a normally solid copolymer of 5-95% by weight of 1,1-difluoroisobutylene with vinyl fluoride.

6. The normally-solid copolymer of 5-95% by weight of 1,1-difluoroisobutylene with vinylidene fluoride.

7. A film of a normally-solid copolymer of 5-95% by weight of 1,1-difluoroisobutylene with tetrafluoroethylene.

8. A film of a normally-solid copolymer of 5-95% by weight of 1,1-difluoroisobutylene with vinylidene fluoride.

References Cited in the file of this patent

UNITED STATES PATENTS

| | | |
|---|---|---|
| 2,446,382 | Mochel | Aug. 3, 1948 |
| 2,479,367 | Joyce et al. | Aug. 16, 1949 |
| 2,549,580 | Denison et al. | Apr. 17, 1951 |
| 2,626,252 | Tawney | Jan. 20, 1953 |
| 2,705,706 | Dittman et al. | Apr. 5, 1955 |
| 2,733,278 | Anderson | Jan. 31, 1956 |
| 2,852,573 | Blout | Sept. 16, 1958 |

FOREIGN PATENTS

| | | |
|---|---|---|
| 720,118 | Great Britain | Dec. 15, 1954 |